(12) United States Patent
Teng et al.

(10) Patent No.: US 10,737,460 B2
(45) Date of Patent: Aug. 11, 2020

(54) FIBROUS MATS AND PANELS HAVING A GYPSUM-BASED COATING AND METHODS FOR THE MANUFACTURE THEREOF

(71) Applicant: Georgia-Pacific Gypsum LLC, Atlanta, GA (US)

(72) Inventors: Yi-Hsien Harry Teng, Westerville, OH (US); Andrew W. Tricker, San Marino, CA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 155 days.

(21) Appl. No.: 15/402,861

(22) Filed: Jan. 10, 2017

(65) Prior Publication Data

US 2017/0197379 A1     Jul. 13, 2017

Related U.S. Application Data

(60) Provisional application No. 62/276,890, filed on Jan. 10, 2016.

(51) Int. Cl.
*B32B 5/22* (2006.01)
*D06N 3/12* (2006.01)
(Continued)

(52) U.S. Cl.
CPC .............. *B32B 5/022* (2013.01); *B32B 5/26* (2013.01); *B32B 7/12* (2013.01); *D06M 11/76* (2013.01); *D06M 15/17* (2013.01); *D06N 3/0011* (2013.01); *D06N 3/0022* (2013.01); *D06N 3/0063* (2013.01); *D06N 3/12* (2013.01); *B32B 2250/02* (2013.01); *B32B 2250/20* (2013.01); *B32B 2255/02* (2013.01); *B32B 2255/20* (2013.01); *B32B 2255/26* (2013.01);
(Continued)

(58) Field of Classification Search
None
See application file for complete search history.

(56) References Cited

U.S. PATENT DOCUMENTS

| 7,101,921 B2 * | 9/2006 | Edwards | ............... C08F 265/06 523/201 |
| 2002/0155282 A1 * | 10/2002 | Randall | ................... E04C 2/043 428/341 |

(Continued)

FOREIGN PATENT DOCUMENTS

| DE | 19527857 | * | 3/1996 |
| WO | 2013/174951 A1 | | 11/2013 |

OTHER PUBLICATIONS

Machine translation of DE19527857, Edwards et al. (Year: 1996).*
(Continued)

*Primary Examiner* — Shawn Mckinnon

(57) ABSTRACT

Coated nonwoven fibrous mats, building panels, and methods for making the same are provided. A coated nonwoven fiber mat includes a nonwoven fibrous mat having a continuous barrier coating on a surface thereof. The continuous barrier coating includes a set composition of gypsum and a binder. A building panel includes a panel core associated with a coated nonwoven fiber mat. A method of making a coated nonwoven fibrous mat includes depositing a composition of water, gypsum stucco, and a binder onto a surface of a nonwoven fibrous mat and setting the composition to form a continuous barrier coating.

21 Claims, 5 Drawing Sheets

(51) Int. Cl.
*D06M 11/76* (2006.01)
*D06M 15/17* (2006.01)
*B32B 5/02* (2006.01)
*D06N 3/00* (2006.01)
*B32B 5/26* (2006.01)
*B32B 7/12* (2006.01)
*D06N 3/18* (2006.01)
*D06M 101/16* (2006.01)

(52) U.S. Cl.
CPC ..... *B32B 2255/28* (2013.01); *B32B 2260/021* (2013.01); *B32B 2260/023* (2013.01); *B32B 2260/044* (2013.01); *B32B 2260/046* (2013.01); *B32B 2262/02* (2013.01); *B32B 2262/062* (2013.01); *B32B 2262/10* (2013.01); *B32B 2262/101* (2013.01); *B32B 2262/106* (2013.01); *B32B 2262/14* (2013.01); *B32B 2307/3065* (2013.01); *B32B 2307/50* (2013.01); *B32B 2307/536* (2013.01); *B32B 2307/546* (2013.01); *B32B 2307/554* (2013.01); *B32B 2307/71* (2013.01); *B32B 2307/712* (2013.01); *B32B 2307/718* (2013.01); *B32B 2307/7246* (2013.01); *B32B 2307/7265* (2013.01); *B32B 2307/73* (2013.01); *B32B 2307/732* (2013.01); *B32B 2419/06* (2013.01); *B32B 2607/00* (2013.01); *D06M 2101/16* (2013.01); *D06M 2200/30* (2013.01); *D06N 3/183* (2013.01); *D06N 2201/02* (2013.01); *D06N 2201/082* (2013.01); *D06N 2203/022* (2013.01); *D06N 2209/125* (2013.01); *D06N 2209/1685* (2013.01); *D06N 2209/1692* (2013.01); *D06N 2211/06* (2013.01); *D06N 2211/063* (2013.01); *D10B 2101/06* (2013.01); *D10B 2101/12* (2013.01); *D10B 2505/20* (2013.01)

(56) References Cited

U.S. PATENT DOCUMENTS

| | | | |
|---|---|---|---|
| 2005/0202742 A1* | 9/2005 | Smith | B28B 19/0092 442/256 |
| 2011/0206918 A1 | 8/2011 | Smith et al. | |
| 2013/0295286 A1 | 11/2013 | Hauber et al. | |
| 2014/0158273 A1 | 6/2014 | Yu et al. | |
| 2015/0184387 A1 | 7/2015 | Fisher et al. | |

OTHER PUBLICATIONS

International Search Report and Written Opinion for International Application No. PCT/US2017/012824 dated Jan. 10, 2017 (32 pages).

* cited by examiner

FIBROUS MATS AND PANELS HAVING A GYPSUM-BASED COATING AND METHODS FOR THE MANUFACTURE THEREOF

CROSS-REFERENCE TO RELATED APPLICATIONS

This application claims priority benefit to U.S. Provisional Application No. 62/276,890, filed Jan. 10, 2016, which is incorporated by reference herein in its entirety.

BACKGROUND

The present invention relates generally to the field of fibrous mats for use in panels for building construction, and more particularly to fibrous mats having a gypsum-based coating.

Typical building construction panels, such as gypsum drywall, sheathing, roof deck, tile backer, and foam board include a core material, and a facer material, which may be either a fibrous mat or paper facer, both of which act as a board forming substrate and provide reinforcement and surface finishing. Coated fiberglass mat, in particular, is one type of facer material, having high strength, high elastic modulus, and superior surface barrier performance against moisture/water intrusion, weathering, fire, mold/mildew, abrasion, scratching, dusting, itchiness, and dimensional change.

On such building construction panels, the coating on a fiber mat facer typically contains mineral fillers and polymer binders. However, it would be desirable to provide coated fibrous mats and panels having improved strength, surface smoothness, abrasion resistance, fire resistance, decreased dusting, or reduced cost, among other properties.

SUMMARY

In one aspect, building panels are provided, including a panel core associated with a first nonwoven fibrous mat and a continuous barrier coating on a surface of the first nonwoven fibrous mat opposite the panel core, the continuous barrier coating containing a set composition of gypsum and a binder.

In another aspect, coated nonwoven fibrous mats are provided, including a nonwoven fibrous mat having a continuous barrier coating on a surface thereof, wherein the continuous barrier coating contains a set composition of gypsum and a binder.

In yet another aspect, methods of making a coated nonwoven fibrous mat are provided, including depositing a continuous layer of slurry that includes a composition of water, gypsum, and a binder onto a first surface of a nonwoven fibrous mat, and setting or curing the composition to form a solid, continuous barrier coating on the first surface of the nonwoven fibrous mat.

In still yet another aspect, methods of making a building panel are provided, including depositing a composition of water, gypsum stucco, and a binder onto a first surface of a nonwoven fibrous mat, setting or curing the composition to form a continuous barrier coating on the first surface of the nonwoven fibrous mat, depositing a panel core material onto a second surface of a nonwoven fibrous mat either before or after the coating composition is deposited on the first surface of the nonwoven fibrous mat, and setting the panel core material and coating composition to form a panel.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Disclosed herein are nonwoven fibrous mats having a gypsum-based continuous barrier coating, building panels including such coated fibrous mats, and methods for manufacturing such mats and panels. These mats and panels provide advantages over commercially available coated mats and panels, such as improved strength, surface smoothness, fire resistance, lower cost, or decreased manufacturing process energy requirement, among other properties, or combinations of the foregoing. Coated mats, building panels, and methods for the manufacture thereof are described in more detail herein.

Coated Nonwoven Fibrous Mats

Figure 1:
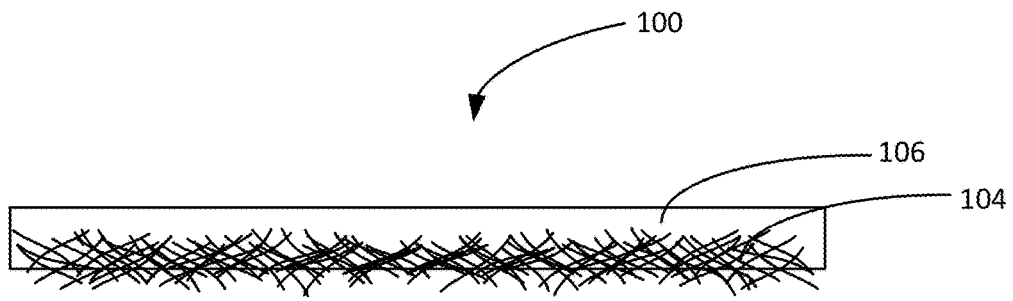
FIG. 1 is a cross-sectional view of a nonwoven fibrous mat having a gypsum-based continuous barrier coating in accordance with an embodiment of this disclosure.

In certain embodiments, as shown in FIG. 1, a coated nonwoven fibrous mat 100 includes a nonwoven fibrous mat 104 having a continuous barrier coating 106 on a surface thereof. In some embodiments, the continuous barrier coating 106 is a set composition including gypsum and a binder. The various layers are shown as separate layers in the figures for ease of illustration; however, it should be understood that overlap of these materials may occur at their interfaces.

Various embodiments of this disclosure are for purposes of illustration only. Parameters of different steps, components, and features of the embodiments are described separately, but may be combined consistently with this description of claims, to enable other embodiments as well to be understood by those skilled in the art. Various terms used herein are likewise defined in the description which follows.

As used herein, the term "continuous barrier coating" refers to the coating material being substantially uninterrupted over the surface of the fibrous mat. The continuous coating coverage of the nonwoven fibrous mat provides certain protection and performance enhancement to the facing material. The continuous barrier coating may be applied on a surface of the fibrous mat and penetrate some portion of the thickness thereof. For example, the coating may penetrate from about 5 percent to about 60 percent of the thickness of the fibrous mat (e.g., about 0.05 mm to about 0.3 mm of a mat having a thickness of about 0.4 mm to about 1.0 mm). For example, a coating may penetrate from about 20 percent to about 50 percent of the thickness of the fibrous mat (e.g., about 0.1 mm to about 0.25 mm of a mat having a thickness of about 0.5 mm to about 0.8 mm). For example, a coating may penetrate from about 10 percent to about 70 percent of the thickness of the fibrous mat (e.g., about 0.04 mm to about 0.7 mm of a mat having a thickness of about 0.4 mm to about 1.0 mm).

In certain embodiments, the continuous barrier coating weighs between about 2 lbs per 100 square feet and about 10 lbs per 100 square feet, on a dry basis. In some embodiments, the continuous barrier coating weighs between about 3 lbs per 100 square feet and about 10 lbs per 100 square feet, on a dry basis.

In certain embodiments, the nonwoven fibrous mat is formed of fiber material that is capable of forming a strong bond with the material of a building panel core (e.g., set gypsum of a gypsum core, porous material of a foamed core) through a mechanical interlocking between the interstices of the fibrous mat and portions of the core material. Examples of fiber materials for use in the nonwoven mats include reinforcement-type materials such as fiberglass, carbon fibers, synthetic polymer fibers, and mixtures or blends thereof. Both chopped strands and continuous strands may be used. Thus, in certain embodiments, the fibrous mat is a fiberglass mat, a polymeric fiber mat, or a hybrid nonwoven mat containing fiberglass and polymeric fibers.

In certain embodiments, the mat is a nonwoven fiberglass mat. For example, the glass fibers may have an average diameter of from about 10 to about 17 microns and an average length of from about ¼ inch to about 1.5 inch. For example, the glass fibers may have an average diameter of 13 microns (i.e., K fibers) and an average length of ¾ inch. In certain embodiments, the non-woven fiberglass mats have a basis weight of from about 1.5 pounds to about 3.5 pounds per 100 square feet of the mat. The mats may each have a thickness of from about 20 mils to about 45 mils.

The fibers may be bonded together to form a unitary mat structure by a suitable binder. For example, the binder may be a urea-formaldehyde resin adhesive, optionally modified with a thermoplastic modifier or cross-linker, such as an acrylic emulsion, polyvinyl acetate emulsion, vinyl-acrylic emulsion, or similar aqueous resins.

The continuous barrier coating on the fibrous mat may be a set composition including, at the least, gypsum and a binder. In certain embodiments, the gypsum is set gypsum derived from (i.e., formed from) gypsum hemihydrate (conventionally called stucco or plaster) through hydration in water. The gypsum stucco may be any suitable gypsum powder calcined from gypsum dihydrate, either gypsum minerals or industrial byproducts known in the art. In one embodiment, the gypsum hemihydrate is gypsum stucco typically referring to beta hemihydrate gypsum. In another embodiment, the gypsum hemihydrate is gypsum plaster, typically referring to alpha hemihydrate gypsum. Upon rehydration of gypsum hemihydrate in presence of water during the manufacturing process, set gypsum dihydrate is formed. Thus, the gypsum present in a set composition may refer to gypsum dihydrate, whereas the gypsum based coating may refer to compositions comprising water, gypsum hemihydrate and a binder as starting materials or set compositions comprising gypsum dihydrate and a binder. The gypsum stucco may be in a particulate or powder form. For example, the gypsum stucco may have a particle size such that at least 95% of the particles pass through a 100 mesh wire screen. In some embodiments, the gypsum may be in anhydrite form.

In some embodiments, the continuous barrier coating contains gypsum dihydrate in an amount of from about 10 to about 95 weight percent, on a dry basis. In some embodiments, the continuous barrier coating contains gypsum dihydrate in an amount of from about 30 to about 95 weight percent, on a dry basis. In certain embodiments, the continuous barrier coating contains gypsum in an amount from about 75 to about 97 weight percent, on a dry basis. For example, the continuous barrier coating may contain gypsum in an amount from about 80 to about 95 weight percent, on a dry basis. In one embodiment, the continuous barrier coating may contain gypsum in an amount from about 85 to about 90 weight percent, on a dry basis.

The binder of the continuous barrier coating may be any suitable binder known in the art. In certain embodiments, the binder is a polymer material. In some embodiments, the binder is derived from a polymer latex or resin. In some embodiments, the continuous barrier coating contains binder in an amount from about 5 to about 30 weight percent, on a dry basis. In certain embodiments, the continuous barrier coating contains binder in an amount from about 3 to about 25 weight percent, on a dry basis. For example, the continuous barrier coating may contain binder in an amount from about 5 to about 20 weight percent, on a dry basis. In one embodiment, the continuous barrier coating may contain binder in an amount from about 10 to about 15 weight percent, on a dry basis.

In some embodiments, the binder is a polymer latex adhesive. For example, the binder may be acrylic, polyvinyl acrylic copolymers, styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, their esters and derivatives thereof (acrylic-type polymers), such as styrene-acrylate copolymers. In certain embodiments, the polymer resin binder may contain urea formaldehyde or phenolic chemistries.

In certain embodiments, the binder is a hydrophobic, ultraviolet (UV) resistant polymer latex adhesive. For example, the hydrophobic, UV resistant polymer latex binder adhesive may be based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as stryrene) which are known to the art to be suitable in the preparation of UV resistant (meth)acrylic polymer latexes.

In certain embodiments, the composition of the continuous barrier coating further includes one or more optional additives, such as glass fibers, polymer fibers, dispersants, water repellents, accelerators, retarders, colorants (e.g., dyes or pigments), transfer agents, thickeners or rheological control agents, viscosity modifiers, hollow spheres, mineral platelets, inorganic fillers, surfactants, ammonia compositions, defoamers, biocides, UV absorbers, inorganic hollow spheres mineral platelets, or preservatives.

Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.). Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.). Defoamers may include multi-hydrophobe blend defoamers and other defoamers known to those of ordinary skill in the art. For example, defoamers may include FOAMASTER SA-3, commercially available from BASF Corporation. Ammonia compositions may include ammonium hydroxide, for example, AQUA AMMONIA 26 BE, commercially available from Tanner Industries, Inc. (Southampton, Pa.). Biocides may include broad-spectrum microbicides that prohibit bacteria and fungi growth, antimicrobials such as those based on the active diiodomethyl-ptolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives. UV absorbers may include encapsulated hydroxyphenyl-triazine compositions and other compounds known to those of ordinary skill in the art, for example, TINUVIN 477DW, commercially available from BASF Corporation. Transfer agents such as polyvinyl alcohol (PVA) and other compounds known to those of ordinary skill in the art may also be included in the coating composition.

In certain embodiments, the continuous barrier coating is present on the fibrous mat in an amount from about 3 pounds to about 7 pounds, per 100 ft$^2$, on a dry basis. For example, the coating may be present on the fibrous mat in an amount from about 4 pounds to about 6 pounds, per 100 ft$^2$, on a dry basis. In certain embodiments, the continuous barrier coating is present on the fibrous mat in an amount from about 3 pounds to about 8.5 pounds, per 100 ft$^2$, on a dry basis.

Figure 2:
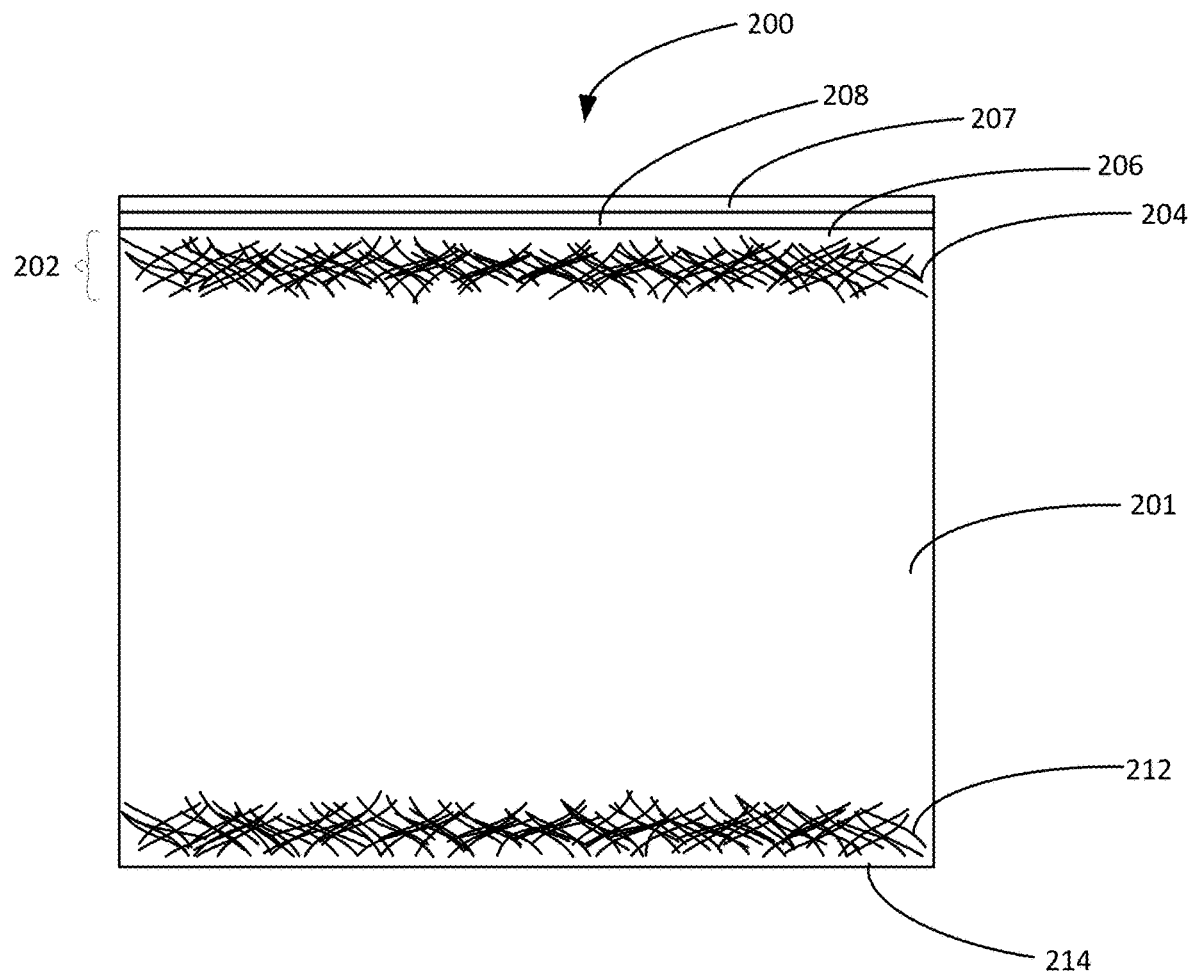
FIG. 2 is a cross-sectional view of a building panel having a nonwoven fibrous mat facer having a gypsum-based continuous barrier coating in accordance with an embodiment of this disclosure.

In certain embodiments, as shown in FIG. 2, a coated nonwoven fibrous mat 202 also includes an additional polymer coating 208 on a surface of the continuous barrier coating 206 opposite the nonwoven fibrous mat 204. For example, the polymer coating may include any of the binder materials mentioned herein, along with one or more optional additives. In some embodiments, the polymer coating is derived from a latex emulsion or resin composition. For example, the polymer coating may provide enhanced performance and properties, in addition to those provided by the gypsum-based continuous barrier coating.

In certain embodiments, an ultraviolet (UV) resistant coating is present on a surface of the continuous barrier coating opposite the nonwoven fibrous mat, or, as shown in FIG. 2, a UV resistant coating 207 may be provided on a surface of any polymer coating 208 opposite the continuous barrier coating 206. For example, the UV resistant coating may be a top coat, or external coating layer, on the fibrous mat, and may provide improved strength, coating hardness, or abrasion resistance, or a combination thereof, in addition to those provided by the gypsum-based continuous barrier coating.

In certain embodiments, the coated nonwoven fibrous mats described herein display improved strength, water resistance and weather durability. For example, the coated nonwoven fibrous mat may display Gurley porosity of at least 2 seconds. In some embodiments, the coated nonwoven fibrous mat may display Gurley porosity of at least 30 seconds. In one embodiment, the coated nonwoven fibrous mat may display Gurley porosity of at least 32 seconds.

Panels

Building panels are also provided herein. As shown in FIG. 2, a building panel 200 may include a panel core 201 associated with a coated nonwoven fibrous mat 202. For example, the coated nonwoven fibrous mat may include any mat or coating features, or combination of features, described herein. In some embodiments, the nonwoven fibrous mat 204 has a continuous barrier coating 206 on a surface opposite the panel core 201.

Building panels may be any suitable design and may include any suitable known panel core materials. In some embodiments, the building panel is a gypsum panel having a set gypsum core sandwiched between one or two fibrous mats, one or both of which may be coated. In other embodiments, the building panel is a foam panel, such as a polyisocyanurate or polyurethane panel. In one embodiment, the building panel core is a foamed or low-density polymeric material. In some embodiments, the panel core contains cementitious materials. In certain embodiments, the panel core contains inorganic hollow microspheres. In one embodiment, the panel core contains expanded or exfoliated low-density inorganic materials. In some embodiments, the panel core contains inorganic materials and an inorganic binder.

As shown in FIG. 2, in certain embodiments, a building panel 200 includes a panel core 201 that is associated with a first fibrous mat 204. The fibrous mat 204 has a continuous barrier coating 206 thereon, which penetrates a portion of the first fibrous mat 204 opposite the panel core 201. Material of the panel core 201 may penetrate at least some of a remaining fibrous portion of the first fibrous mat 204 such that voids in the first fibrous mat 204 are substantially eliminated.

In certain embodiments, the panel core includes one or more gypsum layers. For example, the gypsum core may include various gypsum layers having different compositions. In some embodiments, the first gypsum layer that is in contact with the fibrous mat (i.e., the layer that forms an interface with the coating material and at least partially penetrates the remaining fibrous portion of the first fibrous mat) is hydrophobic. The first gypsum layer may be a slate coat layer. In some embodiments, the first gypsum layer is present in an amount from about 5 percent to about 20 percent, by weight, of the gypsum core.

In certain embodiments, the nonwoven fibrous mat is a nonwoven fiberglass mat. In certain embodiments, as shown in FIG. 2, a building panel 200 includes two fibrous mats 204, 212 that are associated with the panel core 201. The second fibrous mat 212 is present on a face of the panel core 201 opposite the first fibrous mat 204. In some embodiments, only the first fibrous mat also has a continuous barrier coating on a surface thereof. In other embodiments, both fibrous mats 204, 212 have a coating 206, 214 on a surface thereof opposite the panel core 201. In some embodiments, the panel core is a gypsum core that includes three gypsum layers. One or both of the gypsum layers that are in contact with the fibrous mats may be a slate coat layer. In some embodiments, the nonwoven fibrous mat is a fiberglass mat containing polymer filler. In some embodiments, the nonwoven fibrous mat is a nonwoven polymeric fiber mat.

In building panels having a gypsum core, the layers of the gypsum core may be similar to gypsum cores used in other gypsum products, such as gypsum wallboard, dry wall, gypsum board, gypsum lath, and gypsum sheathing. For example, the gypsum core may be formed by mixing water with powdered anhydrous calcium sulfate or calcium sulfate hemihydrate stucco, also known as calcined gypsum, to form an aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum.

In certain embodiments, one or more layers of the gypsum core also include reinforcing fibers, such as chopped glass fibers. For example, the gypsum core, or a layer thereof, may include up to about 0.6 pounds of reinforcing fibers per 100 square feet of panel. For example, the gypsum core, or a layer thereof, may include about 0.3 pounds of reinforcing fibers per 100 square feet of panel. The reinforcing fibers may have a diameter between about 10 and about 17 microns and have a length between about 6.35 and about 12.7 millimeters.

The gypsum core may also include a variety of additives, such as accelerators, set retarders, foaming agents, and dispersing agents. The gypsum core, or one or more layers thereof, may also include an additive that improves the water-resistant properties of the core. Such additives may include, for example, poly(vinyl alcohol), optionally including a minor amount of poly(vinyl acetate); metallic resinates; wax, asphalt, or mixtures thereof, for example as an emulsion; a mixture of wax and/or asphalt and cornflower and potassium permanganate; water insoluble thermoplastic organic materials such as petroleum and natural asphalt, coal tar, and thermoplastic synthetic resins such as poly(vinyl acetate), poly(vinyl chloride), and a copolymer of vinyl acetate and vinyl chloride, and acrylic resins; a mixture of metal rosin soap, a water soluble alkaline earth metal salt, and residual fuel oil; a mixture of petroleum wax in the form of an emulsion and either residual fuel oil, pine tar, or coal tar; a mixture of residual fuel oil and rosin; aromatic isocyanates and diisocyanates; organopolysiloxanes; siliconates; a wax emulsion and a wax-asphalt emulsion, each optionally with potassium sulfate, alkali, or alkaline earth aluminates, and Portland cement; a wax-asphalt emulsion prepared by adding to a blend of molten wax and asphalt, an oil-soluble, water-dispersing emulsifying agent, and admixing the aforementioned with a solution of case including, as a dispersing agent, an alkali sulfonate of a polyarylmethylene condensation product. Mixtures of these water-resistance additives may also be employed. For example, a mixture of two or more of: poly(vinyl alcohol), siliconates, wax emulsion, and wax-asphalt emulsion of the aforementioned types, may be used to improve the water resistance of the gypsum core.

The gypsum core, or one or more layers thereof, may also include one or more additives that enhance the inherent fire resistance of the gypsum core. Such additives may include chopped glass fibers, other inorganic fibers, vermiculite, clay, Portland cement, and other silicates, among others. In certain embodiments, the building panel is fire resistant.

In certain embodiments, the building panels have a thickness from about ¼ inch to about 1 inch. For example, the panels may have a thickness of from about ½ inch to about ⅝ inch.

Methods

Methods for manufacturing coated fibrous mats and building panels having coated fibrous mats are also provided herein. In certain embodiments, a method of making a coated nonwoven fibrous mat includes depositing (also referred to herein as "adhering") a composition of water, gypsum stucco, and a binder onto a first surface of a nonwoven fibrous mat, and setting or curing the composition to form a solid, continuous barrier coating on the first surface of the nonwoven fibrous mat. For example, the composition may be applied as a continuous layer of slurry to the nonwoven fibrous mat.

In certain embodiments, depositing the slurry onto the nonwoven fibrous mat is carried out using a knife coater, curtain coater, roll coater, slot die coater, or a combination thereof.

For example, the gypsum stucco may be any suitable gypsum powder known in the art. In one embodiment, the gypsum stucco is hemihydrate gypsum stucco, such as alpha hemihydrate gypsum, beta hemihydrate gypsum, or a combination thereof. Upon rehydration of gypsum hemihydrate during the manufacturing process, set gypsum dihydrate is formed. Thus, the gypsum present in a set composition may refer to gypsum dihydrate, whereas the gypsum stucco combined with the binder to form the coating composition may refer to gypsum hemihydrate. The gypsum stucco may be in a particulate or powder form. For example, the gypsum stucco may have a particle size such that at least 95% of the particles pass through a 100 mesh wire screen.

In some embodiments, the continuous barrier coating contains gypsum dihydrate in an amount of from about 10 to about 95 weight percent, on a dry basis. In some embodiments, the continuous barrier coating contains gypsum dihydrate in an amount of from about 30 to about 95 weight percent, on a dry basis. In certain embodiments, the continuous barrier coating contains gypsum in an amount from about 75 to about 97 weight percent, on a dry basis. For example, the continuous barrier coating may contain gypsum in an amount from about 80 to about 95 weight percent, on a dry basis. In one embodiment, the continuous barrier coating may contain gypsum in an amount from about 85 to about 90 weight percent, on a dry basis.

The binder of the continuous barrier coating may be any suitable binder known in the art. In certain embodiments, the binder is a polymer material. In some embodiments, the binder is derived from a polymer latex or resin. In some embodiments, the continuous barrier coating contains binder in an amount from about 5 to about 30 weight percent, on a dry basis. In certain embodiments, the continuous barrier coating contains binder in an amount from about 3 to about 25 weight percent, on a dry basis. For example, the continuous barrier coating may contain binder in an amount from about 5 to about 20 weight percent, on a dry basis. In one embodiment, the continuous barrier coating may contain binder in an amount from about 10 to about 15 weight percent, on a dry basis. In certain embodiments, the binder is an aqueous binder, such that the water in the composition is provided at least partially by the binder. In other embodiments, water is added to the composition.

In one embodiment, a slurry coating composition contains gypsum dihydrate in an amount of from about 30 to about 95 weight percent, on a dry basis, and binder in an amount from about 10 to about 15 weight percent, on a dry basis.

In certain embodiments, the mat is a nonwoven fiberglass mat. For example, the glass fibers may have an average diameter of from about 10 to about 17 microns and an average length of from about ¼ inch to about 1 inch. For example, the glass fibers may have an average diameter of 13 microns (i.e., K fibers) and an average length of ¾ inch. In certain embodiments, the non-woven fiberglass mats have a basis weight of from about 1.5 pounds to about 3.5 pounds per 100 square feet of the mat. The mats may each have a thickness of from about 20 mils to about 35 mils.

In certain embodiments, the coating composition also contains one or more optional additives, such as glass fibers, polymer fibers, dispersants, water repellents, accelerators, retarders, colorants (e.g., dyes or pigments), transfer agents, thickeners or rheological control agents, viscosity modifiers, colorants, hollow spheres, mineral platelets, inorganic fillers, surfactants, ammonia compositions, defoamers, biocides, UV absorbers, or preservatives.

In certain embodiments, methods of making coated nonwoven fibrous mats also include depositing a latex or resin polymer coating, an ultraviolet resistant coating, or both, on a surface of the continuous barrier coating opposite the nonwoven fibrous mat.

Methods of making building panels include depositing a panel core material onto a surface of a nonwoven fibrous mat and setting the panel core material to form a panel core. In one embodiment, depositing the panel core material includes depositing one or more gypsum core layers. In some embodiments, depositing one or more gypsum layers includes depositing at least one slate coat layer. In other embodiments, depositing the panel core material includes depositing one or more foam layers, such as polyisocyanurate or polyurethane layers.

For building panels having a gypsum core, the gypsum core may be formed by mixing water with powdered anhydrous calcium sulfate or calcium sulfate hemihydrate stucco, also known as calcined gypsum, to form an aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum. The gypsum core may also include a variety of additives, such as accelerators, set retarders, foaming agents, and dispersing agents.

In certain embodiments, a gypsum slurry may be deposited on an uncoated surface of a fibrous mat and set to form a gypsum core of the panel. The gypsum slurry may penetrate some remaining fibrous portion of the thickness of the fibrous mat (i.e., some portion of the fibrous mat that is not already penetrated by the coating) and provide a mechanical bond for the panel. The gypsum slurry may be provided in one or more layers, having the same or different compositions, including one or more slate coat layers. As used herein, the term "slate coat" refers to a gypsum slurry having a higher wet density than the remainder of the gypsum slurry that forms the gypsum core.

In certain embodiments, other additives or agents may be combined with the gypsum stucco, water, and the cementitious material to form the slurry. Such additional agents may be included to control the setting and strength development. For example, one or more accelerators, dispersants, retarders, seeding materials, or combinations thereof, may be combined with the gypsum stucco, water, and cementitious material. Reactive additives containing amorphous silica, such as silica fume, diatomaceous earth, pumice, fly ash, slag, or a combination thereof, may also be combined with the gypsum stucco, water, and cementitious material. In one embodiment, glass fibers, polymer fibers, cellulose fibers, other material fibers, or a combination thereof are combined with the gypsum stucco, water, and cementitious material.

In certain embodiments, the step of combining the gypsum stucco, water, and cementitious material includes combining some or all of the dry ingredients together and subsequently combining the dry ingredients with the liquid ingredients, including the water. For example, the cementitious material and the gypsum stucco may first be combined to form a dry mix that is subsequently combined with the water. In one embodiment, the dry mix includes the cementitious material in an amount from 0.1 percent to 10 percent by weight of the dry mix. For example, the dry mix may include the cementitious material in an amount from about 0.5 percent to about 3 percent by weight of the dry mix, from about 0.5 percent to about 2 percent by weight of the dry mix, or from about 0.7 percent to about 1.5 percent by weight of the dry mix. In one embodiment, the slurry includes water in an amount from about 50 percent to about 100 percent by weight of the dry mix.

In certain embodiments, the slurry is set and dried to form a gypsum panel. For example, the setting may be necessary to harden the gypsum composite quickly. For example, drying the slurry may include drying the composite in an oven or other suitable drying apparatus, hearing the slurry under moist or steamed conditions, and/or allowing gypsum composite to harden quickly. In certain embodiments, the gypsum slurry setting and drying the slurry includes curing the slurry between two facers, which may be paper, nonwoven glass, or other suitable mats.

In certain embodiments, methods of making a gypsum panel include depositing a gypsum slurry onto a surface of a first fiberglass mat opposite a continuous barrier coating that penetrates a portion of the first fiberglass mat, and allowing the gypsum slurry to set to form a gypsum core, wherein the gypsum slurry penetrates a remaining fibrous portion of the first fiberglass mat such that voids in the first fiberglass mat are substantially eliminated. These methods may be used to produce gypsum panels having any of the features, or combinations of features, described herein.

In certain embodiments, the gypsum core includes multiple layers that are sequentially applied to the fiberglass mat, and allowed to set either sequentially or simultaneously. In some embodiments, a second fiberglass mat may be deposited onto a surface of the final gypsum slurry layer (or the sole gypsum slurry layer), to form a dual mat-faced gypsum panel. For example, the second fiberglass mat may include a barrier coating on its surface that penetrates a portion of the mat. The gypsum slurry or multiple layers thereof may be deposited on the fiberglass mat by any suitable means, such as roll coating.

In some embodiments, the gypsum core includes at least three gypsum layers, with the outermost gypsum layers of the gypsum core (i.e., the layers that form an interface with the fiberglass mats) being slate coat layers. In certain embodiments, both outermost layers have a relatively high density or are otherwise chemically altered for enhanced penetration. In certain embodiments, the first gypsum slurry (or each of the outermost gypsum slurry layers) is deposited in an amount of from about 5 percent to about 20 percent, by weight, of the gypsum core.

In certain embodiments, the gypsum slurry (or one or more layers thereof) includes a wetting agent that functions to reduce the surface tension of the gypsum slurry. In certain embodiments, the wetting agent is selected from a group consisting of hydrophobic additives, surfactants, superplasticisers, dispersants, agents containing hydrophobic additives, agents containing surfactants, agents containing superplasticisers, agents containing dispersants, and combinations thereof. In some embodiments, the wetting agent is present in the gypsum slurry in an amount of about 0.05 percent to about 1 percent, by weight. In certain embodiments, the gypsum slurry (or one or more layers thereof) includes a hydrophobic additive. For example, the gypsum slurry or layer(s) may include wax, silicone, siloxane, or a combination thereof. In certain embodiments, the gypsum slurry (or one or more layers thereof) includes a superplasticiser. For example, suitable superplasticisers include Melflux 2651 F and 4930F, commercially available from BASF Corporation. In certain embodiments, the gypsum slurry (or one or more layers thereof) includes a polymer binder.

In certain embodiments, the first and/or second fibrous mats are already coated upon contacting the gypsum (or other panel core) slurry. In some embodiments, the methods include applying the continuous barrier coating to the first and/or second fibrous mat, either before or after contacting the mats with the panel core slurry. Certain methods of making a building panel include providing an uncoated nonwoven fibrous mat, depositing a panel core material onto a surface of the nonwoven fibrous mat, depositing a slurry coating containing water, gypsum hemihydrate and a binder onto the exterior surface of the nonwoven fibrous mat, and setting both the coating and panel core materials.

In certain embodiments, applying the barrier coating includes spray coating, knife coating, curtain coating, slot die coating, immersion coating, gravure coating, metering rod coating, and/or direct or transfer roll coating. In some embodiments, the barrier coating is applied to each of the first and/or second fibrous mats in an amount from about 1 pound to about 9 pounds, per 100 ft$^2$. For example, the barrier coating may be applied to the first and/or second fibrous mat in an amount from about 2 pounds to about 8 pounds, per 100 ft$^2$. In other embodiments, coated fibrous mats may be obtained in a pre-fabricated form.

In certain embodiments, the panel core slurry (or layers thereof) may be deposited on the non-coated side of a horizontally oriented moving web of pre-coated fibrous mat. A second coated or uncoated fibrous mat may be deposited onto the surface of the panel core slurry opposite the first coated fibrous mat, e.g., a non-coated surface of the second coated fibrous mat contacts the panel core slurry. In some embodiments, a moving web of a pre-coated or uncoated nonwoven fibrous mat may be placed on the upper free surface of the aqueous panel core slurry. Thus, the panel core material may be sandwiched between two fibrous mats, one or both having a barrier coating. In certain embodiments, allowing the panel core material and/or continuous barrier coating to set includes curing, drying, such as in an oven or by another suitable drying mechanism, or allowing the material(s) to set at room temperature (i.e., to self-harden).

Without intending to be bound by a particular theory, it has been found that because of the hydraulic reaction of gypsum stucco with water (i.e., the ability of the stucco to set in the presence of water), gypsum stucco offers unique benefits when its slurry is applied to the surface of nonwoven fibrous mats to form a continuous, self-hardened coating. Such gypsum-based coatings are low cost, quick setting, display low free moisture, and provide added fire resistance, compared to traditionally coated mats. Moreover, such gypsum-based coatings display good uniformity/integrity, low porosity, and good adhesion to a fiberglass mat.

Furthermore, it was discovered that the gypsum-based coatings for fibrous mats described herein have a shorter drying time, and therefore a lower energy requirement, as compared to traditional coatings. It is believed that the shorter drying time is due to the at least partial elimination of free water present in the wet coating composition that occurs as the gypsum hemihydrate converts into a gypsum dihydrate form. Thus, less energy is required to set or dry the gypsum-based coating.

EXAMPLES

Embodiments of gypsum panels having a gypsum-based coating on the front or back fiberglass mat facer, as disclosed herein, were constructed and tested, as described below.

One-half inch gypsum core panels faced with coated fiberglass mats were produced in a lab setting. The fiberglass mats were coated with a coating slurry containing gypsum hemihydrate stucco, latex (in amounts of 10 and 15 percent, by weight), water, dispersant, siloxane, siliconate, glass fiber, and foam, as shown in Table 1 below. Comparative control samples having the same gypsum core and fiberglass mats with a traditional mat coating including a latex binder with calcium carbonate filler were also prepared.

TABLE 1

| Experimental Mat Compositions | |
|---|---|
| Experimental Mats | Description |
| Trial Mat #1 | Coated face mat with 10 percent latex binder in gypsum coating |
| Trial Mat #2 | Coated back mat with 10 percent latex binder in gypsum coating |
| Trial Mat #3 | Coated face mat with 15 percent latex binder in gypsum coating |
| Trial Mat #4 | Coated back mat with 15 percent latex binder in gypsum coating |

Figure 6:
FIG. 6 is a micrograph of a nonwoven fiberglass mat having a gypsum-based continuous barrier coating in accordance with an embodiment of this disclosure.

As shown in FIG. 6, the coated fiberglass mat showed a continuous, uniform coat of the composition.

Figure 3:
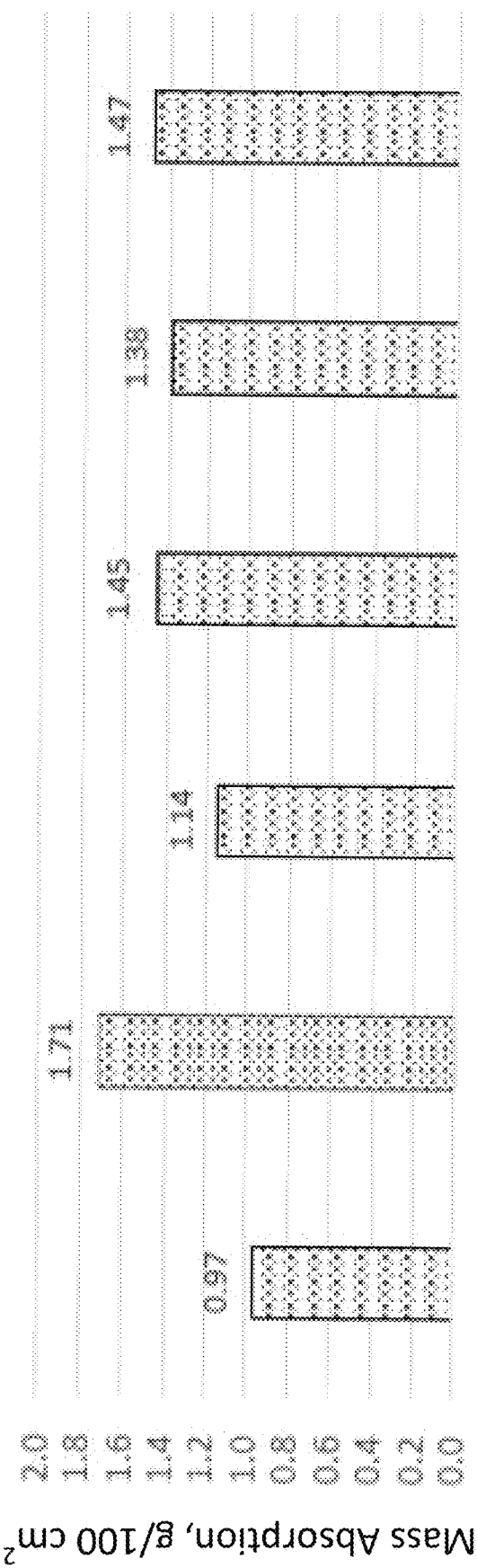
FIG. 3 is a graph showing the comparative surface water absorption (Cobb) results of gypsum panels having a gypsum-based continuous barrier coating on a fiberglass mat facer, per Example 1.

Flexural strength, nail pull, water absorption, surface Cobb, and humid bond tests were performed on the samples. FIG. 3 shows the surface Cobb test results for samples having the gypsum-based coating on the face and back mat of the panel, for coating compositions containing 10 and 15 percent, by weight, latex, as indicated. FIG. 3 shows the amount of water in grams absorbed across the coated fiberglass mat under the Cobb test. The panels having the mat facers coated with the gypsum-based coating performed relatively similarly to the control in surface water absorption, slightly higher on the face and slightly lower on the back.

Figure 4:
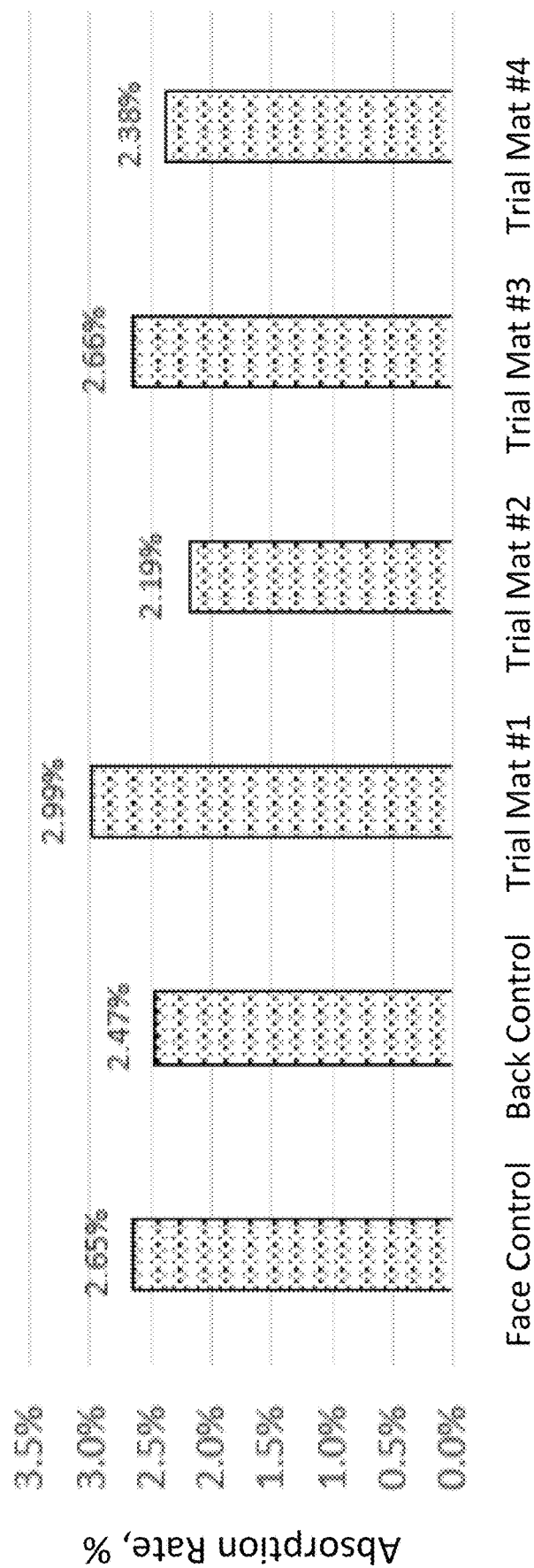
FIG. 4 is a is a graph showing the comparative two-hour water absorption test results of gypsum panels having a gypsum-based continuous barrier coating on a fiberglass mat facer, per Example 1.

FIG. 4 shows the rate of water absorption over two hours for similar samples. Again, the panels having the face mat coated with the gypsum-based coating performed similarly to the control, absorbing about the same or slightly more water than the control. The panels having the back mat coated with the gypsum-based coating each performed slightly better than the control, absorbing less water.

Figure 5:
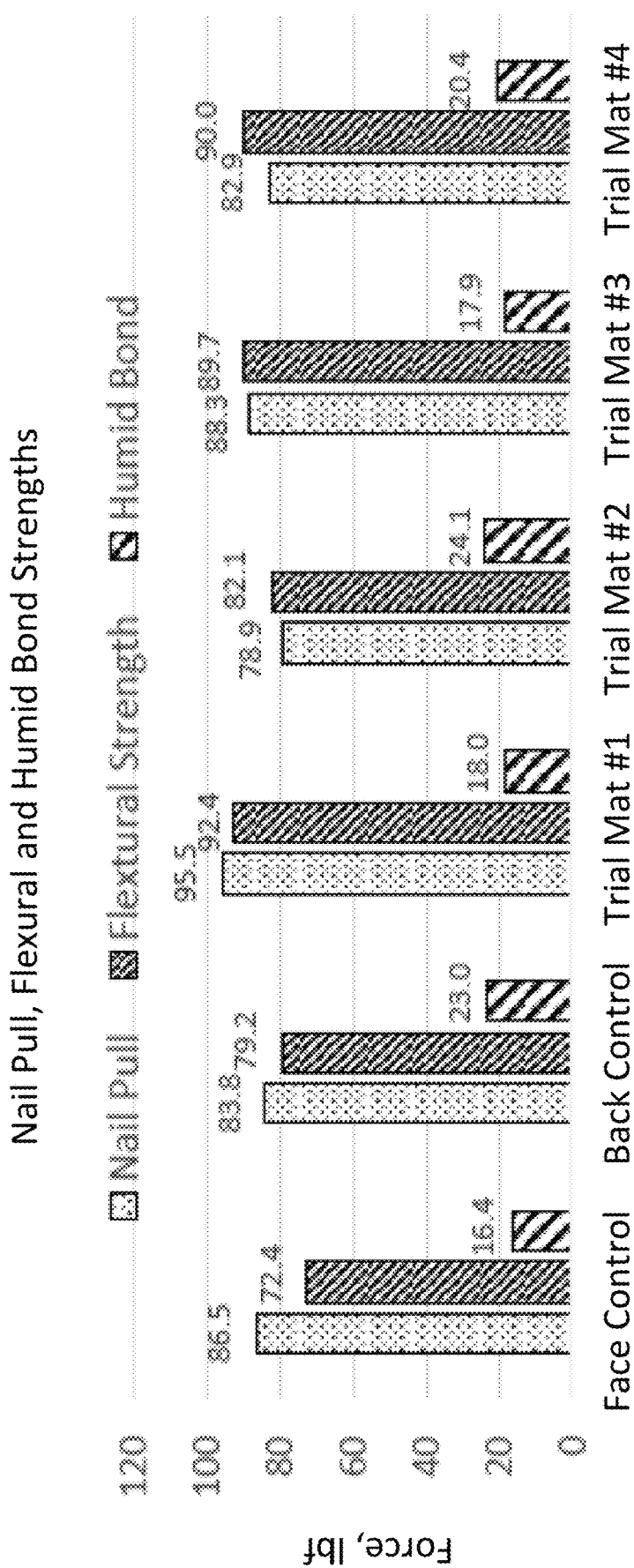
FIG. 5 is a graph showing the comparative nail pull, flexural strength, and humid bond strength test results of gypsum panels having a gypsum-based continuous barrier coating on a fiberglass mat facer, per Example 1.

FIG. 5 shows the results of the Flexural strength, nail pull, and humid bond tests for these samples. Flexural properties were evaluated by testing 4 inch×12 inch specimens with the length aligned in the cross machine direction of the glass mat facer and applying a transverse load midway between the two supports having a 10 inch span. The ability of the gypsum panel to resist nail pull-through is evaluated by determining the load required to push a standard nail head through the product. The humid bond tests resistance to delamination of the glass mat facer from the gypsum core of a 4 inch×6 inch specimen after conditioning under 90° F. and 90% humidity.

Thus, gypsum-based coatings provide fibrous mats and building panels having performance characteristics that are similar to or better than traditional coatings, while using a low cost and abundant raw material (gypsum stucco). Moreover, the energy required for manufacturing mat facers having a gypsum-based coating is reduced compared to traditional mat facers due to hydration of gypsum hemihydrate to form gypsum dihydrate.

Embodiments of the present disclosure further include any one or more of the following paragraphs:

1. A building panel, as described herein.
2. A method of making a building panel, as described herein.
3. A coated nonwoven fibrous mat, as described herein.
4. A method of making a coated nonwoven fibrous mat, as described herein.
5. A building panel, comprising:
    a panel core associated with a first nonwoven fibrous mat;
    a continuous barrier coating on a surface of the first nonwoven fibrous mat opposite the panel core, the continuous barrier coating comprising a set composition that comprises gypsum and a binder.
6. The building panel of paragraph 5, wherein the panel core comprises one or more core layers.
7. The building panel of paragraph 6, wherein one or more core layers comprise at least one slate coat layer.
8. The building panel of paragraphs 5 to 7, wherein the panel core comprises one or more layer compositions.
9. The building panel of paragraph 8, wherein the panel core comprises one or more gypsum layer compositions.
10. The building panel of paragraph 8, wherein the panel core comprises one or more polyisocyanurate or polyurethane layer compositions.
11. The building panel of paragraphs 5 to 8, wherein the panel core comprises foamed or low-density polymeric materials.
12. The building panel of paragraphs 5 to 11, wherein the panel core comprises cementitious materials.
13. The building panel of paragraphs 5 to 12, wherein the panel core comprises inorganic hollow spheres.
14. The building panel of paragraphs 5 to 13, wherein the panel core comprises expanded or exfoliated low-density inorganic materials.
15. The building panel of paragraphs 5 to 14, wherein the panel core comprises inorganic materials and an inorganic binder.
16. The building panel of paragraphs 5 to 15, where the panel core comprises inorganic materials and a polymer binder.
17. The building panel of paragraphs 5 to 16, wherein the first nonwoven fibrous mat is a nonwoven fiberglass mat.
18. The building panel of paragraphs 5 to 16, wherein the first nonwoven fibrous mat comprises fiberglass and polymer fiber.
19. The building panel of paragraphs 5 to 16, wherein the first nonwoven fibrous mat is a nonwoven polymeric fiber mat.
20. The building panel of paragraphs 5 to 19, wherein the binder is derived from a polymer emulsion or resin composition.
21. The building panel of paragraphs 5 to 20, wherein the gypsum is derived from gypsum hemihydrate.
22. The building panel of paragraphs 5 to 21, wherein the coating composition further comprises one or more additives selected from a group consisting of glass fiber, polymer fiber, dispersant, water repellent, biocide, defoamer, viscosity modifier, colorant, accelerator, retarder, hollow spheres, mineral platelets, and inorganic fillers.
23. The building panel of paragraphs 5 to 22, wherein the coating weighs between 3 lbs per 100 square feet and 8.5 lbs per 100 square feet, on a dry basis.
24. The building panel of paragraphs 5 to 23, wherein the coating has an average depth of penetration into the fibrous mat between about 10% and about 70% of a thickness of the first nonwoven fibrous mat.
25. The building panel of paragraphs 5 to 24, further comprising:
    a polymer coating on a surface of the continuous barrier coating opposite the first nonwoven fibrous mat, the polymer coating being derived from a latex emulsion or resin composition.
26. A coated nonwoven fibrous mat, comprising:
    a nonwoven fibrous mat having a continuous barrier coating on a surface thereof,
    wherein the continuous barrier coating comprises a set composition comprising gypsum and a binder.
27. The coated nonwoven fibrous mat of paragraph 26, wherein nonwoven fibrous mat is a nonwoven fiberglass mat.
28. The coated nonwoven fibrous mat of paragraph 26, where nonwoven fibrous mat is a polymeric fiber mat.
29. The coated nonwoven fibrous mat of paragraph 26, where nonwoven fibrous mat is a hybrid nonwoven mat comprising fiberglass and polymeric fiber.
30. The coated nonwoven fibrous mat of paragraph 26, where nonwoven fibrous mat contains carbon fibers.
31. The coated nonwoven fibrous mat of paragraphs 26 to 30, wherein the binder is derived from a polymer latex emulsion or resin composition.
32. The coated nonwoven fibrous mat of paragraphs 26 to 31, wherein the gypsum is derived from gypsum hemihydrate.
33. The coated nonwoven fibrous mat of paragraphs 26 to 32, wherein the coating composition further comprises one or more additives selected from a group consisting of glass fiber, polymer fiber, dispersant, water repellent, biocide, defoamer, viscosity modifier, colorant, accelerator, retarder, hollow spheres, mineral platelets, and inorganic fillers.
34. The coated nonwoven fibrous mat of paragraphs 26 to 33, further comprising:
    a polymer coating on a surface of the continuous barrier coating opposite the nonwoven fibrous mat, the polymer coating being derived from a polymer latex emulsion or resin composition.
35. The coated nonwoven fibrous mat of paragraphs 26 to 34, wherein the coated nonwoven fibrous mat displays a Gurley porosity of at least 2 seconds.
36. The coated nonwoven fibrous mat of paragraphs 26 to 35, wherein the coating weighs between about 3 lbs per 100 square feet and about 8.5 lbs per 100 square feet on a dry basis.

37. The coated nonwoven fibrous mat of paragraphs 26 to 36, wherein the coating has an average depth of penetration into the fibrous mat between about 10% and about 70% of a thickness of the nonwoven fibrous mat.

38. A method of making a coated nonwoven fibrous mat, comprising:
    depositing a continuous layer of coating slurry that comprises a composition of water, gypsum, and a binder onto a first surface of a nonwoven fibrous mat; and
    setting or curing the composition to form a solid, continuous coating on the first surface of the nonwoven fibrous mat.

39. The method of paragraph 38, wherein nonwoven fibrous mat is a nonwoven fiberglass mat.

40. The method of paragraphs 38 to 39, wherein the binder comprises a polymer latex emulsion or resin composition.

41. The method of paragraphs 38 to 40, wherein the gypsum is gypsum hemihydrate.

42. The method of paragraphs 38 to 41, wherein depositing the continuous layer of slurry is carried out using a knife coater, curtain coater, roll coater, metering rod coater, slot die coater, or a combination thereof.

43. The method of paragraphs 38 to 42, wherein the coating slurry composition comprises gypsum hemihydrate in an amount of from about 30 to about 95 percent, by dry weight of the composition, and binder in an amount of from about 5 to about 30 percent, by dry weight of the composition.

44. The method of paragraphs 38 to 43, wherein the coating slurry composition further comprises one or more additives selected from a group consisting of glass fiber, polymer fiber, dispersant, water repellent, biocide, defoamer, viscosity modifier, colorant, accelerator, retarder, inorganic hollow spheres, mineral platelets, and inorganic fillers.

45. The method of paragraphs 38 to 44, wherein the coated nonwoven fibrous mat displays a Gurley porosity of at least 2 seconds.

46. The method of paragraphs 38 to 45, wherein the coated nonwoven fibrous mat has a coating weight in the range between about 3 lbs per 100 square feet and about 8.5 lbs per 100 square feet, on a dry basis.

47. The method of paragraphs 38 to 46, wherein the coating has an average depth of penetration into the fibrous mat between about 10% and about 70% of a thickness of the nonwoven fibrous mat.

48. A method of making a building panel, comprising:
    providing a nonwoven fibrous mat having a continuous barrier coating on a first surface, the continuous barrier coating comprising set gypsum and a binder;
    depositing a panel core material onto a second surface of the nonwoven fibrous mat opposite the first surface;
    providing a facing material onto a surface of the panel core opposite the coated nonwoven fibrous mat, and
    setting or curing the panel core material to form a panel.

49. The method of paragraph 48, wherein providing the nonwoven fibrous mat comprises:
    depositing a continuous layer of slurry that comprises a composition of water, gypsum hemihydrate, and a binder onto the first surface of the nonwoven fibrous mat; and
    setting or curing the composition to form a solid, continuous barrier coating on the first surface of the nonwoven fibrous mat.

50. The method of paragraphs 48 to 49, wherein depositing the panel core material comprises depositing one or more gypsum core layers.

51. The method of paragraph 50, wherein depositing one or more gypsum layers comprises depositing at least one slate coat layer.

52. The method of paragraphs 48 to 51, wherein nonwoven fibrous mat is a nonwoven fiberglass mat.

53. The method of paragraphs 48 to 52, wherein the binder is derived from a polymer latex or resin composition.

54. The method of paragraphs 48 to 53, wherein the coating comprises gypsum dihydrate in an amount of from about 33 to about 95 percent, by dry weight of the composition, and binder in an amount of from about 5 to about 30 percent, by dry weight of the composition.

55. The method of paragraphs 48 to 54, wherein the coating further comprises one or more additives selected from a group consisting of glass fiber, polymer fiber, dispersant, water repellent, biocide, defoamer, viscosity modifier, accelerator, retarder, inorganic fillers, and colorant.

56. The method of paragraphs 48 to 55, further comprising:
    depositing a polymer coating on a surface of the continuous barrier coating opposite the nonwoven fibrous mat, the polymer coating comprising a polymer latex or resin.

57. The method of paragraphs 48 to 56, wherein the coated nonwoven fibrous mat has a coating weight in the range between about 3 lbs per 100 square feet and about 8.5 lbs per 100 square feet, on a dry basis.

58. The method of paragraphs 48 to 57, wherein depositing the panel core material comprises depositing one or more polyisocyanurate layers.

59. A method of making a building panel, comprising:
    adhering a panel core material to a second surface of a nonwoven fibrous mat, or vice versa;
    depositing a continuous layer of coating slurry that comprises a composition of water, gypsum hemihydrate, and a binder onto a first surface of the nonwoven fibrous mat, opposite the second surface, and
    setting or curing the panel core material and the slurry composition to form a panel having a solid, continuous barrier coating on the first surface of the nonwoven fibrous mat.

60. The method of paragraph 59, wherein the panel core material comprises one or more panel core layers.

61. The method of paragraph 60, wherein the panel core material comprises at least one slate coat layer.

62. The method of paragraphs 59 to 61, wherein nonwoven fibrous mat is a nonwoven fiberglass mat.

63. The method of paragraphs 59 to 62, wherein the binder comprises a polymer latex emulsion or resin composition.

64. The method of paragraphs 59 to 63, wherein the composition comprises gypsum hemihydrate in an amount of from about 30 to about 95 percent, by dry weight of the composition, and binder in an amount of from about 5 to about 30 percent, by dry weight of the composition.

65. The method of paragraphs 59 to 64, wherein the composition further comprises one or more additives selected from a group consisting of glass fiber, polymer fiber, dispersant, water repellent, biocide, defoamer, viscosity modifier, accelerator, retarder, inorganic fillers, and colorant.

66. The method of paragraphs 59 to 65, wherein the continuous barrier coating weighs between about 3 lbs per 100 square feet and about 10 lbs per 100 square feet, on a dry basis.

67. The method of paragraphs 59 to 66, further comprising:
depositing a polymer coating on a surface of the continuous barrier coating opposite the nonwoven fibrous mat, the polymer coating comprising a latex emulsion or resin.

68. The method of paragraphs 59 to 67, wherein the panel core material comprises one or more polyisocyanurate layers.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A building panel, comprising:
a panel core associated with a first nonwoven fibrous mat;
a continuous barrier coating on a surface of the first nonwoven fibrous mat opposite the panel core, the continuous barrier coating comprising a set composition that comprises fully rehydrated gypsum hemihydrate and a binder,
wherein the set composition comprises the rehydrated gypsum hemihydrate in an amount of from about 75 to about 97 percent, by dry weight of the composition,
wherein the continuous barrier coating penetrates a partial portion of a thickness of the first nonwoven fibrous mat,
wherein the panel core penetrates at least some of a remaining portion of the thickness of the first nonwoven fibrous mat.

2. The building panel of claim 1, wherein the coating weighs between 2 lbs per 100 square feet and 8.5 lbs per 100 square feet, on a dry basis.

3. The building panel of claim 1, wherein the coating has an average depth of penetration into the fibrous mat between about 10% and about 70% of a thickness of the first nonwoven fibrous mat.

4. The building panel of claim 1, wherein the binder is derived from a polymer emulsion or resin composition.

5. The building panel of claim 1, further comprising:
a polymer coating on a surface of the continuous barrier coating opposite the first nonwoven fibrous mat, the polymer coating being derived from a latex emulsion or resin composition.

6. The building panel of claim 1, wherein the first nonwoven fibrous mat is a nonwoven fiberglass mat, a nonwoven polymeric fiber mat, or a mat comprising fiberglass and polymer fiber.

7. A coated nonwoven fibrous mat, comprising:
a nonwoven fibrous mat having a continuous barrier coating on a surface thereof,
wherein the continuous barrier coating comprises a set composition comprising fully rehydrated gypsum hemihydrate and a binder,
wherein the set composition comprises the rehydrated gypsum hemihydrate in an amount of from about 75 to about 97 percent, by dry weight of the composition,
wherein the continuous barrier coating penetrates a partial portion of a thickness of the first nonwoven fibrous mat,
wherein at least some of a remaining portion of the thickness of the first nonwoven fibrous mat is unoccupied by the continuous barrier coating.

8. The coated nonwoven fibrous mat of claim 7, wherein the coated nonwoven fibrous mat displays a Gurley porosity of at least 2 seconds.

9. The coated nonwoven fibrous mat of claim 7, wherein the coating weighs between about 2 lbs per 100 square feet and about 8.5 lbs per 100 square feet on a dry basis.

10. The coated nonwoven fibrous mat of claim 7, wherein the coating has an average depth of penetration into the fibrous mat between about 10% and about 70% of a thickness of the nonwoven fibrous mat.

11. The coated nonwoven fibrous mat of claim 7, wherein the binder is derived from a polymer latex emulsion or resin composition.

12. The coated nonwoven fibrous mat of claim 7, further comprising:
a polymer coating on a surface of the continuous barrier coating opposite the nonwoven fibrous mat, the polymer coating being derived from a polymer latex emulsion or resin composition.

13. The coated nonwoven fibrous mat of claim 7, wherein the nonwoven fibrous mat is a nonwoven fiberglass mat, a nonwoven polymeric fiber mat, or a mat comprising fiberglass and polymer fiber.

14. A method of making a coated nonwoven fibrous mat, comprising:
depositing a continuous layer of coating slurry that comprises a composition of water, gypsum hemihydrate, and a binder onto a first surface of a nonwoven fibrous mat to penetrate into a partial portion of a thickness of the nonwoven fibrous mat and to leave at least some of a remaining portion of the thickness of the nonwoven fibrous mat unoccupied by the slurry; and
setting or curing the composition to fully rehydrate the gypsum hemihydrate to form a solid, continuous coating on the first surface of the nonwoven fibrous mat, wherein the solid, continuous coating comprises the fully rehydrated gypsum hemihydrate in an amount of from about 75 to about 97 percent, by dry weight of the composition.

15. The method of claim 14, wherein the nonwoven fibrous mat is a nonwoven fiberglass mat, a nonwoven polymeric fiber mat, or a mat comprising fiberglass and polymer fiber.

16. The method of claim 14, wherein the binder comprises a polymer latex emulsion or resin composition.

17. The method of claim 14, wherein the coating slurry composition comprises the binder in an amount of from about 5 to about 30 percent, by dry weight of the composition.

18. The method of claim 14, wherein the coated nonwoven fibrous mat displays a Gurley porosity of at least 2 seconds.

19. The method of claim 14, wherein the coated nonwoven fibrous mat has a coating weight in the range between about 2 lbs per 100 square feet and about 8.5 lbs per 100 square feet, on a dry basis.

20. The method of claim 14, wherein the coating has an average depth of penetration into the fibrous mat between about 10% and about 70% of a thickness of the nonwoven fibrous mat.

21. The building panel of claim 1, wherein the coating comprises a wetting agent.

* * * * *